United States Patent [19]

Washio et al.

[11] Patent Number: 5,151,486
[45] Date of Patent: Sep. 29, 1992

[54] METHOD OF MANUFACTURING RADIOACTIVE RAY MEASURING DEVICE USING PURE DGEBA AND DDM IN 1:1 MOLAR RATIO

[75] Inventors: Masakazu Washio, Yokohama; Syun-ichi Kawanishi, Osaka, both of Japan

[73] Assignees: Sumitomo Heavy Industries, Ltd.; Japan Atomic Energy Research Institute, both of Tokyo, Japan

[21] Appl. No.: 517,030

[22] Filed: May 1, 1990

[30] Foreign Application Priority Data

May 1, 1989 [JP] Japan .................................. 1-112559

[51] Int. Cl.$^5$ ............................................. C08G 59/58
[52] U.S. Cl. ............................... 528/124; 264/331.12; 428/413
[58] Field of Search ......................................... 528/124

[56] References Cited

U.S. PATENT DOCUMENTS

| | | | |
|---|---|---|---|
| 2,989,498 | 6/1961 | Mackenzie et al. | 528/124 |
| 3,714,120 | 1/1973 | Labana et al. | 528/124 X |
| 4,568,727 | 2/1986 | Herzog et al. | 528/124 X |
| 4,593,056 | 6/1986 | Qureshi et al. | 528/124 X |

FOREIGN PATENT DOCUMENTS

| | | | |
|---|---|---|---|
| 523522 | 4/1956 | Canada . | |
| 548508 | 10/1959 | Canada | 528/124 |

OTHER PUBLICATIONS

Lee et al., *Handbook of Epoxy Resins*, McGraw-Hill, N.Y., 1967, pp. 17–43 and 17–45.
Bruins, *Epoxy Resin Technology*, Interscience, N.Y., 1968, pp. 63–64.

*Primary Examiner*—John C. Bleutge
*Assistant Examiner*—Frederick Krass
*Attorney, Agent, or Firm*—Cushman, Darby & Cushman

[57] ABSTRACT

Pure diglycidylether of bisphenol A and pure diaminodiphenylmethane are mixed at a ratio of 1:1 and cured in a two-step curing comprising pre-curing at 80°~120° C. and main-curing at 140°~180° C., to produce very pure epoxy resin having a purity of 99% or more. The product epoxy resin can detect radioactive rays through 630 nm light absorption band.

4 Claims, 2 Drawing Sheets

METHOD OF MANUFACTURING RADIOACTIVE RAY MEASURING DEVICE USING PURE DGEBA AND DDM IN 1:1 MOLAR RATIO

BACKGROUND OF THE INVENTION

This invention relates to measurement of radioactive rays, and more particularly to a method of manufacturing a radioactive ray measuring device by which the amount or dose of irradiated radioactive rays can be easily measured at a high precision.

It is very important to measure the dose of irradiated radioactive rays in the products, materials, etc. which may be subjected to radioactive rays in various radioactive ray irradiating facilities, such as atomic furnaces, nuclear fusion furnaces, and all the facilities which emit radioactive rays.

Conventionally, many kinds of dosimeter have been developed and utilized. These dosimeters which are often used in recent years include alanine dosimeter, CTA dosimeter, radiochromic dosimeter, etc.

In the alanine dosimeter, non-paired electrons which are produced by irradiating radioactive rays on alanine specimen are measured by electron spin resonance (ESR). Thus, an ESR system which is expensive and large, is necessary. Further, for achieving accurate dose measurement, uniform specimens of controlled density, etc. are necessary. Also, it is necessary for the measuring ESR system to have a uniform magnetic field. Usually, high precision among specimens cannot be expected without using the same ESR system. It is difficult to perform highly accurate dose measurement by using the alanine dosimeter. Much efforts will be required to achieve precise measurements by using the alanine dosimeter.

In CTA dosimeter, radioactive rays are irradiated on a cellulose acetate specimen and light absorption in the irradiated cellulose acetate specimen, appearing in ultra violet region is measured. Thus, a spectrometer of ultra violet region is necessary. Further, since the subject absorption is in the ultra violet region, the measurement is sensitive to stain of grease, oil, etc. Special care should be paid for the handling of specimens and measuring tools. Yet further, since the spectrum in the measurement wavelength region does not exhibit isolated peaks, the reading of measured absorption is apt to be inaccurate. The range of measurable dose is at most 150 kGy.

In a radiochromic dosimeter, radioactive rays are irradiated to a nylon specimen added with about 30% of dye, and then the absorption bands appearing around 600 nm and 510 nm are measured. This radiochromic dosimeter also responds to light rays. Therefore, the read can vary largely depending on how for light rays are shielded. Further, the read can also vary depending on the humidity. In such way, this dosimeter is inconvenient in handling. The measurable dose range of this dosimeter is up to 30 kGy. However, relatively good precision can be obtained by paying sufficient attentions.

When using a CTA or radio chromic dosimeter, an accurate dose cannot be measured until at least one day has elapsed after the irradiation. Also the dose cannot be known unless the specimen is taken out after the irradiation and is measured by a separate instrument.

SUMMARY OF THE INVENTION

An object of this invention is to provide dosimetry capable of easily measuring radioactive rays at a high precision.

Another object of this invention is to provide dosimetry capable of measuring the amount of irradiated radioactive rays rapidly and in a wide range of dose.

Further object of this invention is to provide a method of manufacturing a radioactive ray measuring device capable of measuring radioactive rays easily and at a high precision.

According to an aspect of this invention, there is provided a method of manufacturing a radioactive ray measuring device comprising steps of mixing one part of diglycidylether of bisphenol A and about one part of diaminodiphenylmethane, not containing any metal salt, pre-curing the mixture at a temperature of 80°-120° C. to align the two components and to achieve preliminary bridging, curing the pre-cured mixture at a temperature of 140°-180° C. to achieve sufficient bridging to produce epoxy resin of purity of at least 99%.

The epoxy resin has radioactive durability and is expected to exhibit radioactive ray detectability. In ordinarily available epoxy resins, however, clear absorption bands cannot be observed. It has been discovered by the present inventors that the metal salt which is a component or components of curing accelerator, which is usually added to the resin for enhancing bridging (curing) reactions, generate a light absorption band or bands and make it difficult to find out the light absorption produced by the radioactive rays. Also, the metal salt makes it difficult to store the radioactive ray detector for a long period.

For excluding the metal salt such as the curing accelerator which works as an impurity in order to make a highly pure epoxy resin, the present inventors tried to produce a high purity epoxy resin by using only the diglycidylether of bisphenol A (DGEBA) as a matrix material and diaminodiphenylmethane (DDM) as a curing agent or hardener. Since no curing accelerator is used, curing does not proceed swiftly. Thus, two step curing comprising pre-curing and main-curing is adopted. Suffcient curing is found possible by carring out pre-curing at 80°-120° C. and main-curing at 140°-180° C.

Further, when no curing accelerator is used, the surface of epoxy body after the pre-curing is still sticky and it is difficult to obtain smooth surface after curing. The present inventors succeeded to obtain a smooth surface by using a jig made of polyethylene terephthalate or polyethylene naphthalate, without abrasion or polishing.

By irradiating radioactive rays, a single light absorption peak appears at a wavelegth of about 630 nm in pure epoxy resin. The area or height of this absorption peak varies according to the amount of irradiated dose. Therefore, the amount of irradiated radioactive rays can be measured by measuring the light absorption around the wavelength 630 nm.

As is described above, epoxy resin adapted for measuring radioactive rays is provided, and measurement of radioactive rays can be achieved easily and at a high precision by using this specially produced high purity epoxy resin.

Further, in-situ observation in the radioactive environment can be done.

DESCRIPTION OF PREFERRED EMBODIMENTS

Diglycidylether of bisphenol A (DGEBA) is used as the epoxy matrix material. Diaminodiphenyl methane (DDM) of special class reagent grade is added as a curing agent to the epoxy matrix material of DGEBA at a molar ratio of 1:1. The mixture is well stirred. For example, the mixture is mixed in a mixer, etc. for about 30 minutes to form a fluid of an appropriate viscosity.

This mixture material is loaded in a jig formed of polyethylene terephthalate (trade name Mylar) or polyethylene naphthalate (trade name Q). For example, the mixed material is sandwiched between of pair of Mylar sheets each of a self-supporting thickness of 120 μm or above.

The mixed material pre-cured at a temperature between 80° C. and 120° C. in a state of being sandwiched between a pair of Myler sheets in a jig. Preferably the mixed material is hot-pressed in a vacuum atmosphere at a temperature of 110° C.±5° C. for about one hour. By this pre-curing process, the two components are aligned or configured and achieve pre-bridging.

Next, the pre-cured materal is subjected to curing in a temperature range of 140° C.~180° C. in the jig. Preferably the mixed material is hot-pressed in a vacuum atmosphere at a temperature of 150° C.±5° C. for about an hour. The cured epoxy resin is taken out from the jig to provide a film shaped or plate shaped epoxy resin material.

By the use of the above-mentioned jig, substantially optically flat surfaces are provided.

When no jig is used, the cured surface is rough. It is, however, also possible to obtain an optically flat surface by abrading and polishing.

Figure 1:
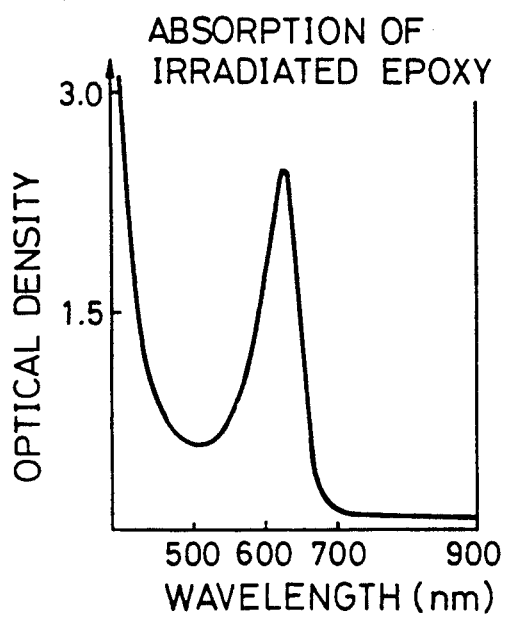
FIG. 1 is a graph showing an absorption spectrum of an epoxy resin specimen irradiated with radioactive rays.

Here, the raw materials used are selected from high purity materials, further, the curing accelerator which are usually used are not used. The curing accelerator which is usually contained by several per cents or more in the final product epoxy resin are totally excluded. Epoxy resin of a purity 99% or above is produced. Especially for an epoxy resin material for use in detecting neutrons, if a metal or metals are included, the epoxy resin becomes radioactive. Thus, it is preferable to exclude any metal as small as possible. The metal contents should be at most 1 p.p.m. or less. The epoxy resin thus produced shows an absorption band around a wavelength of 630 nm by irradiation of radioactive rays. FIG. 1 shows this absorption band. The abscissa represents the wavelength in nanometers, and the ordinate represents the optical density log (IO/I). A strong absorption appears below about 500 nm, and the tail thereof extends near 700 nm and a substantially symmetric single light absorption peak appears centering at about 630 nm. Here, the absorption peak appearing in FIG. 1 is generated when high purity epoxy resin specimen produced by mixing DGEBA and DDM as described above is irradiated with gamma rays emitted from $^{60}Co$. An absorption peak centering at about 630 nm appears similarly in the epoxy resin specimen irradiated with various radioactive rays other than the gamma rays.

It is also possible to obtain an optical density by taking the logarithm of the radio of the intensity IO of the transmission of a specimen which is not absorbing yet to the intensity I of the transmission of the specimen which has become absorbing. The absorption intensity per unit thickness can be obtained by knowing the thickness of the specimen. When a standard calibration curve is defined for the relation of the optical density and the dose of the irradiation, the amount of dose can be obtained by measuring the optical density.

Figure 2:
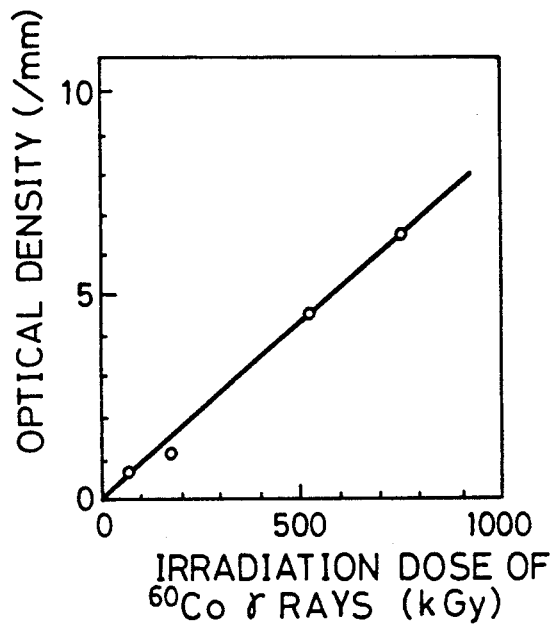
FIG. 2 is a graph showing variations in the optical density of an epoxy resin specimen at 630 nm with respect to the irradiated dose of $^{60}Co$ gamma rays.

FIG. 2 is a graph showing the light absorption intensity (optical density) of the epoxy resin at a wavelegth of 630 nm with respect to the irradiated dose of gamma rays from $^{60}Co$, where gamma rays from $^{60}Co$ are irradiated on an epoxy resin specimen manufactured as described above. The optical density increases almost linearly in the measured range up to about 800 kGy.

Figure 3:
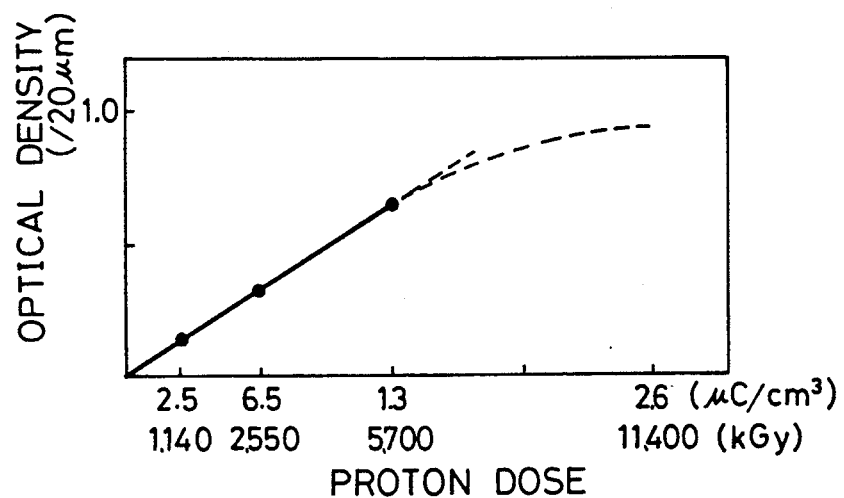
FIG. 3 is a graph showing variations in the optical density of an epoxy resin specimen at 630 nm with respect to the irradiated dose of proton rays.

FIG. 3 shows a graph showing the optical absorption intensity (optical density) of the epoxy resin specimen of a thickness of 20 μm at a wavelength of 630 nm with respect to the dose of irradiated proton, where proton is irradiated on the epoxy resin specimen prepared as described above.

The optical density increaces almost linearly with respect to the dose up to about 6 MGy.

Figure 4:
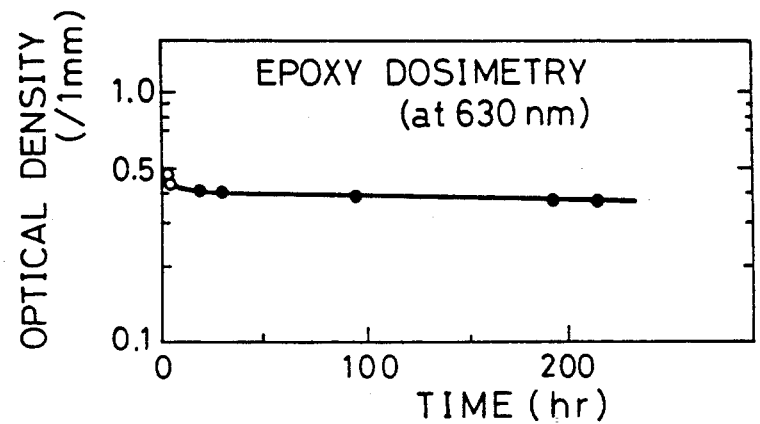
FIG. 4 is a graph showing variations in the optical density of an epoxy resin specimen at 630 nm after irradiation of radioactive rays.

The absorption has a time dependence as shown in FIG. 4. The absorption rapidly decreases in about 5-6 minutes. after the irradiation of radioactive rays, then gradually decreases, and is stabilized in about 10 hours. Thereafter, the amount of absorption drop is at most about 10% even when one week has elapsed. The absorption does not change much by the parameters except time. Therefore, when about 10 hours has elapsed after the irradiation of radioactive rays, measurement of high precision can be easily conducted. Of course, when absorption characteristics just after the irradiation have been measured, in-situ (on-line) observation can be done in a radioactive ray irradiating area by controlling time.

Figure 5:
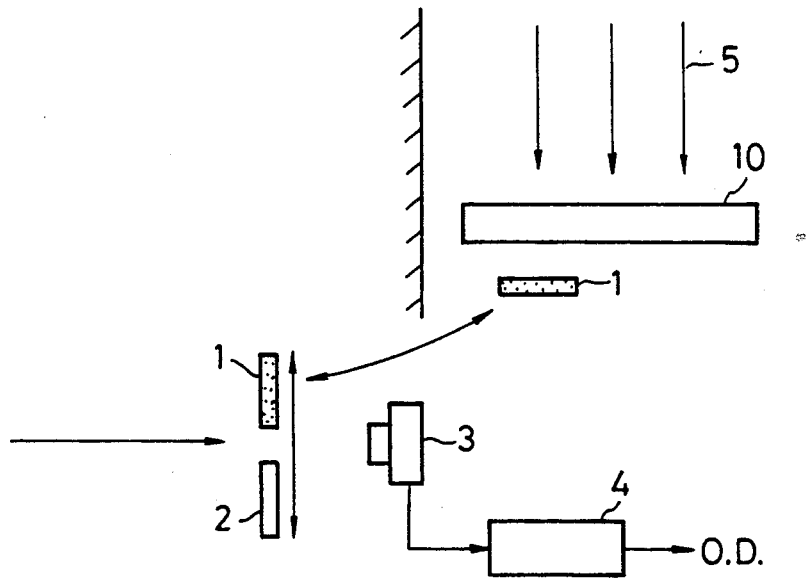
FIG. 5 is a diagram schematically showing a system for measuring radioactive rays.

FIG. 5 schematically shows a system for measuring radioactive rays.

In a radioactive ray irradiating area, radioactive rays 5 irradiate a subject body 10. For example, let us consider a case where the dose of irradiation on this subject body 10 should be measured. An epoxy resin specimen 1 as a radioactive ray detector is placed at a position where radioactive rays are irradiated through the subject body 10.

The epoxy resin specimen 1 is irradiated by radioactive rays and gradually becomes to absorb the lights around 630 nm by the change occuring in the epoxy resin specimen. By irradiating the epoxy resin specimen 1 with radioactive rays, the epoxy resin specimen 1 increases the intensity of light absorption band centering at 630 nm. The intensity of the transmitted light decreases by the increase in the light absorption band. This change is almost irreversible. The area or the height of the light absorption band (oscillator strength) corresponds to the integral value of the radioactive rays irradiated thereon. The wavelength of the absorption band is located in the visible red region, being relatively immune to oils and greases. Further, high precision measurement can be easily done by controlling the time after the irradiation or by elapsing more than about 10 hours after irradiation. The change in the epoxy resin specimen is not saturated up to a very high integrated dose, thus measurement of radioactive rays in a wide dose range and long period is made possible.

When measurement is to be done, the irradiated epoxy resin specimen 1 is transfered to the outside of the radioactive ray irradiating area and placed parallel to a reference epoxy resin specimen 2 which is made of the same material and is not irradiated with radioactive rays. For example, a light ray from the same red light source, for example of a He-Ne laser or a AlGaAs light emitting diode, is directed to the specimens to measure the respective transmissions by a light detector 3. A signal processor 4 takes the ratio of the transmission of the epoxy resin specimen 2 not irradiated with radioactive rays to the transmission of the epoxy resin specimen 1 irradiated with radioactive rays, and produces the logarithm thereof to provide the optical density.

When measurement is to be continued, the epoxy resin specimen 1 is returned to the radioactive ray measuring position.

Although the description has been made on the limited number of embodiments, various modifications, substitutions, alterations, combinations, etc. are possible without departing from the spirit of this invention.

We claim:

1. A method of manufacturing a radioactive ray measuring device comprising the steps of:
    mixing diglycidylether of bisphenol A and diaminodiphenylmethane at a 1:1 molar ratio, both not containing any metal salt;
    pre-curing the mixture at a temperature of 80°–120° C. to align the two components and to achieve preliminary bridging; and
    curing the pre-cured mixture at a temperature of 140°–180° C. to achieve sufficient bridging to produce epoxy resin of purity of at least 99%.

2. A method of manufacturing a radioactive ray measuring device according to claim 1, wherein said pre-curing step includes loading the mixture in a jig of polyethylene terephthalate or polyethylene naphthalate, and said pre-curing step and said curing step are done on the mixture loaded in the jig.

3. A product produced by the method of manufacturing a radioactive ray measuring device comprising the steps of:
    mixing diglycidylether of bisphenol A and diaminodiphenylmethane at a 1:1 molar ratio, both not containing any metal salt;
    pre-curing the mixture at a temperature of 80°–120° C. to align the two components and to achieve preliminary bridging; and
    curing the pre-cured mixture at a temperature of 140°–180° C. to achieve sufficient bridging to produce epoxy resin of purity of at least 99%.

4. A product produced by the method of manufacturing a radioactive ray measuring device comprising the steps of:
    mixing diglycidylether of bisphenol A and diaminodiphenylmethane at a 1:1 molar ratio, both not containing any metal salt;
    loading the mixture in a jig of one of polyethylene terephthalate or polyethylene naphthalate;
    pre-curing the mixture at a temperature of 80°–120° C. to align the two components and to achieve preliminary bridging; and
    curing the pre-cured mixture at a temperature of 140°–180° C. to achieve sufficient bridging to produce epoxy resin of purity of at least 99%.

* * * * *